Aug. 23, 1966     C. R. WISCHMEYER     3,268,860

CORRELATION APPARATUS

Filed Feb. 20, 1964

*INVENTOR.*
CARL R. WISCHMEYER,

BY *John B. Davidson*

ATTORNEY.

3,268,860
CORRELATION APPARATUS
Carl R. Wischmeyer, Houston, Tex., assignor, by mesne assignments, to Esso Production Research Company, Houston, Tex., a corporation of Delaware
Filed Feb. 20, 1964, Ser. No. 346,146
5 Claims. (Cl. 340—15.5)

This invention relates to apparatus for correlating electrical signals, and more particularly to apparatus for producing an electrical signal indicative of the time position of a binary code signal of maximal length in an input data signal comprising the binary code signal in an extraneous signal having a longer time duration than the binary code signal. A more particular aspect of the invention relates to a seismic prospecting technique wherein elongated wave trains of seismic signals are transmitted into the earth.

Various techniques are used in connection with seismic prospecting. One type that has found increasing use in recent years involves injecting an elongated vibratory seismic signal into the earth and detecting the resulting seismic waves produced thereby at one or more detecting stations removed from the transmitting location. The signal is operated on in order that the time interval required for the seismic signals to travel down into the earth, to be reflected by a subsurface reflecting horizon, and to travel back to the earth's surface may be measured. A counterpart of replica electrical signal of the transmitted signal is produced by geophones stationed at the transmitting location. The counterpart signal is correlated with each detected signal. Correlation between the counter-part electrical signal and an electrical signal representative of detected seismic waves as it has been practiced in the past is a very time-consuming process and has been one of the shortcomings of the method.

The most successful technique for varying the transmitted signal to permit the time measurement indicated above has been to vary one of the characteristics of the injected signal in accordance with a shift register or null-sequence binary code of maximal length. The term "shift register or null-sequence binary code of maximal length" signifies a binary code formed by operating on a binary code group of "$n$" digits according to a predetermined rule of formation such that the code group will not repeat itself before $2^n-1$ digits. Expressed in another manner, the binary code of maximal length is the binary code wherein a binary group of "$n$" digits at the beginning thereof is not repeated until the code has $2^n-1$ digits therein. For example, if the code group 01101 is used, "$n$" will be equal to 5 and $2^n-1$ equals 31. A shift register binary code of maximal length can be formed therefrom by starting off with the code group 01101 and setting the next element equal to the sum modulo 2 of the first, second, third and fifth digits preceding it. This process is repeated for each successive element and the following code group is obtained:

0110100001100100111110111000101

By applying the above-specified rule of formation it will be found that after 31 elements the sequence will repeat. For more complete discussion of shift register or null-sequence codes of maximal length, reference may be had to the following: "The Synthesis of Linear Sequential Coding Networks" by D. A. Huffman, Proc. Third London Symposium on Information Theory, September 1955; "Several Binary-Sequence Generators" by N. Zierler, Tech. Rep. 95, Lincoln Laboratory, Massachusetts Institute of Technology, Cambridge, Massachusetts, September 1955.

Injecting a binary code of maximal length into the earth in the form of a seismic signal pre-supposes that a characteristic of the seismic signal is variable between two distinct conditions. For example, the amplitude may be varied between two magnitudes or the phase may be varied between two phase relationships. As a specific example, the injected signal may be made from a constant frequency sinusoidal signal of constant amplitude, the phase of which is varied between mutually opposite phase relationships in accordance with a binary code of maximal length.

It is the usual practice to record in reproducible form the electrical replica signal and the electrical signal produced by detecting the seismic signal so that the electrical signals subsequently may be reproduced and cross-correlated to determine the time phase relationship producing a maximum correlation value. For the following reasons it has been found necessary to perform a correlation operation at a time subsequent to the time of the seismic observation. First, the correlation operation performed, according to many prior art techniques, consumes an inordinately large amount of time. Second, since it is extremely costly to maintain a seismic crew in the field, as much as possible of the crew's time must be spent making seismic observations. Manifestly, it is desirable to perform a correation operation immediately after making a seismic observation so that the results thereof can be used as a guide for immediately subsequent seismic observations. Therefore, it is desirable to have available a technique for performing "on line" correlation.

In accordance with one aspect of the present invention, there is provided an apparatus for producing an electrical signal indicative of the time position of a shift register binary code signal of maximal length in an input data signal comprising the shift register binary code signal in an extraneous signal having a longer time duration than said binary code signal, which appaartus comprises an evacuated housing, a charged electrical particle gun, means for directing a beam of charged electrical particles between two locations therein, and including a beam intensity control means controlling the intensity of the beam in accordance with a control electrical signal coupled thereto. A plurality of annular conductive rings or open-ended cylinders are positioned along the beam path, individually encircling the beam path. The relative positions of and the spacings between the conductive rings are determined in accordance with a binary code of maximal length. Further provided are means connected to the beam intensity control for receiving the input data signal and for clipping and/or rectifying and converting the data signal to square wave form to control the beam intensity control means. Electrical means are connected to the conductive rings for summing electrical signals induced in the rings and for measuring the elapsed time from the beginning of the data signal to maximum signal events in the summed signal.

Objects and features of the invention not apparent from the above discussion will become evident upon consideration of the following detailed description thereof when taken in connection with the accompanying drawing, wherein.

Figure 1:
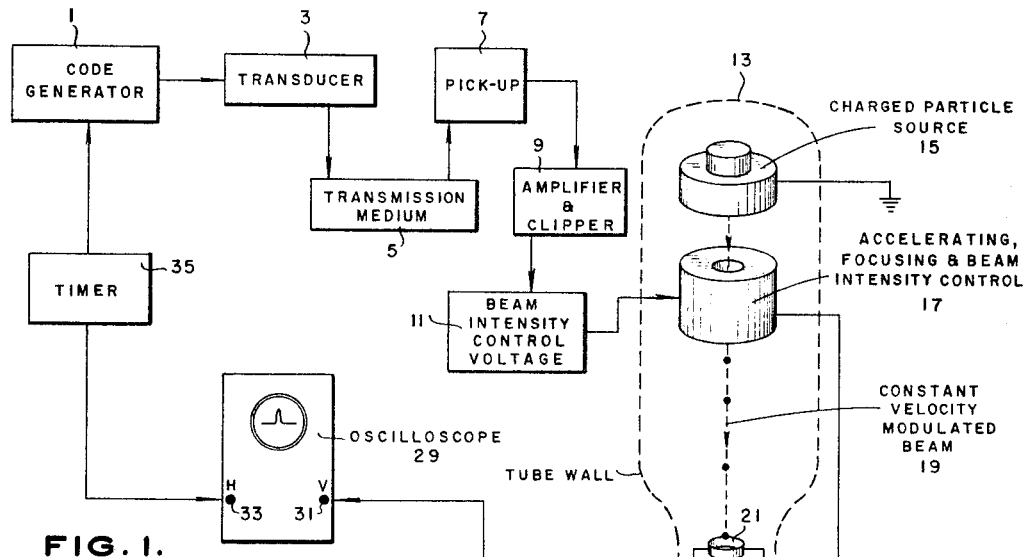
FIG. 1 is an electrical schematic diagram illustrating one embodiment of the present invention.
Figure 2:
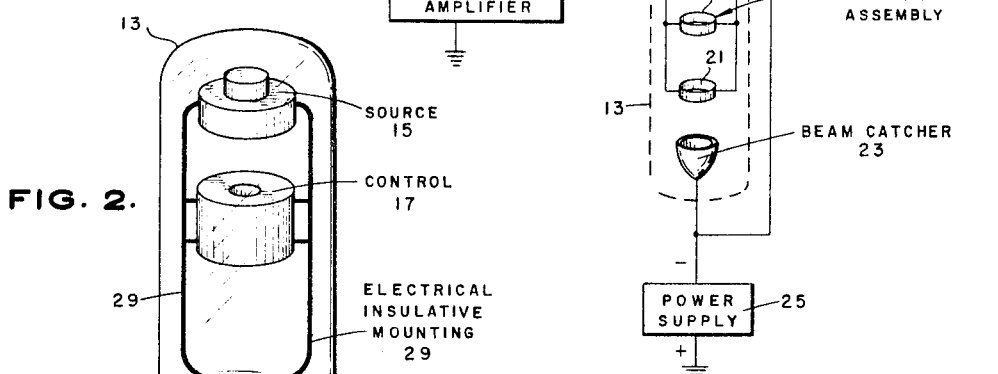
FIG. 2 is a perspective view of a tube mechanism partially assembled and including conductive rings in accordance with the invention.

With reference now to FIG. 1, there is shown a charged electrical particle source means similar in many respects to a conventional eelctron gun apparatus such as is used in cathode-ray tubes and the like. The gun means is shown in very elemental form inasmuch as such apparatus is well known to the art. The gun means comprises an envelope 13 for defining a zone of high vacuum. The envelope 13 may be formed of glass in accordance with usual techniques. Positioned in the envelope 13, as is shown most perspicuously in FIG. 2, is a charged particle source 15. The charged particles produced by the source should be heavy, positive ions. If it is determined that electrons are to be used as the charged electrical particles, the source may be a filament formed in accordance with conventional prior art techniques. If a source of positive ions is desired, the charged particle source 15 may be appaartus such as are described in the following references: "Filament Sources of Positive Ions," J. P. Blewett et al., Physical Review, vol. 50, p. 464 (1936); an article by A. J. Dempster appearing in Rev. Sci. Instr., vol. 7, p. 46 (1936); and article by K. T. Bainbridge, Physical Review, vol. 43, p. 1056 (1933). Other types of positive ion sources known to the art may be used.

Positioned at the opposite end of elongated envelope 13 from the charged particle source 15 is a beam catcher 23 which is held at substantially the same potential as the charged particle source 15 by means of a power supply 25.

Positioned between the charged particle source 15 and the beam catcher 23 is a charged particle accelerating, focusing, and beam intensity control means 17. The function of this device is to accelerate the charged particles to a desired velocity to focus the charged particles emanating from the source 15 into a relatively narrow concentrated beam for directing at the beam catcher 23. Power supply 25 also is connected to means 17 to accelerate the charged particles to the desired velocity. Since catcher 23 and source 15 are at the same potential, the particles drift therebetween at a constant velocity. The beam intenstiy control means functions to gate the flow of charged particles in accordance with the electrical signals coupled thereto. This apparatus may be a system of apertures for focusing the beam held at a desired potential with a pair of deflecting plates for gating the beam similar to those used in a cathode-ray tube. The gating operation may be accomplished by deflecting the beam so that it does not leave the focusing and beam intensity control means 17. The focusing and beam intensity control means 17 is shown in the drawing in block form as being one apparatus. Manifestly, however, the control means 17 may be two separate and distinct apparatuses having separate functions as described above. The beam intensity control means also may be a grid-like structure, the potential of which relative to the charged particle source 15 is varied so as to cut off the flow of charged particles towards the beam catcher 23. Suitable structures for means 17 are described in the text Fundamentals of Vacuum Tubes by A. V. Eastman, 2d Ed. (McGraw-Hill, 1941).

Positioned between the focusing and beam intensity control means 17 and the beam catcher 23 are a plurality of discrete annular conductive members or rings 21. The rings 21 individually encircle the flight path of the charged electrical particles. The spacing between the conductive rings 21 will be discussed below. The rings are electrically connected together and are also connected to the input circuit of an electrometer amplifier 27. The electrometer amplifier is an amplifier of exceedingly high input impedance, such as are manufactured by Keithley Manufacturing Company.

Apparatus for performing a seismic observation is indicated in very elemental form in FIG. 1 by transducer 3, pick-up or geophone 7, and the transmission medium 5 which manifestly would be the earth. The transducer may be an electrohydraulic vibrator adapted to impulse the earth in accordance with electrical signals coupled thereto. Suitable apparatuses for this purpose are manufactured by the M. B. Electronics Company of New Haven, Connecticut and by the Ling Electronics Company of Anaheim, California. Such vibrators utilize a hydraulically actuated piston to vibrate an object and control the hydraulic force on the piston in accordance with variations in the amplitude of a relatively small amplitude electrical signal connected thereto.

In the drawing, the transducer 3 is shown as being controlled by a code generator 1, although it is to be understood that a magnetic tape reproducing unit may be used for this purpose. A vibratory signal may be prerecorded on a magnetic tape for repetitive reproduction by the recorder. However, a code generator, such as described in U.S. Patent No. 3,119,097 of F. N. Tullos, also may be used for this purpose. The purpose of the code generator is to produce an output signal having a characteristic thereof which is varied between two conditions in accordance with a shift register binary code of maximal length. A triggering signal for starting the operation of the code generator or for initiating reproduction of an electrical signal by a magnetic tape reproducer is derived from timer 35. The timer 35 produces timing pulses which are fed to the code generator and to the horizontal sweep circuit 33 of a cathode-ray oscilloscope 29. The function of the cathode-ray oscilloscope and timer 35 in combination is to measure elapsed time from each activating pulse produced by the timer to events in the summed electrical signal of the conductive rings 21 appearing in the output circuit of electrometer amplifier 27. The output signal of amplifier 27 is fed to the vertical sweep circuit 31 of the oscilloscope 29.

The output signal from the geophone 7 is fed to an amplifier and clipper circuit 9 which may be an ordinary seismic amplifier followed by a diode clipper of conventional design. The function of the amplifier and the clipper is to convert the seismic signals from the output of geophone 7 to substantially square waveforms for application to an amplifier 9 for the purpose of controlling the beam intensity control means 17 to switch on and off a beam passing from source 15 to catcher 23, or to deflect the beam so that it will not pass through the conductive rings 21.

As illustrated most perspicuously in FIG. 2, the annular rings 21 are supported in the envelope 13 by an insulative supporting structure 29. The charged particle source 15 and the focusing and beam intensity control means 17 may be supported by the same structure in accordance with the usual techniques. Electrical connections to the charged particle source 15 and to the control means 17 may be through the base 24 or through the wall of envelope 13 in accordance with usual practice. The conductive rings 21 are electrically connected together as indicated in FIG. 1, and the output lead therefrom to amplifier 27 likewise may be through the base 24 or through the envelope 13 of the structure.

Figure 3A:
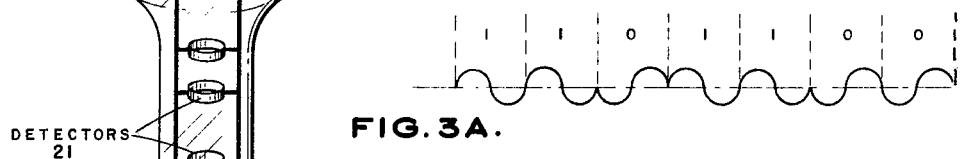
FIGS. 3A and 3B are waveform representations of electrical signals useful in understanding the operation of the apparatus of FIG. 1.
Figure 3B:
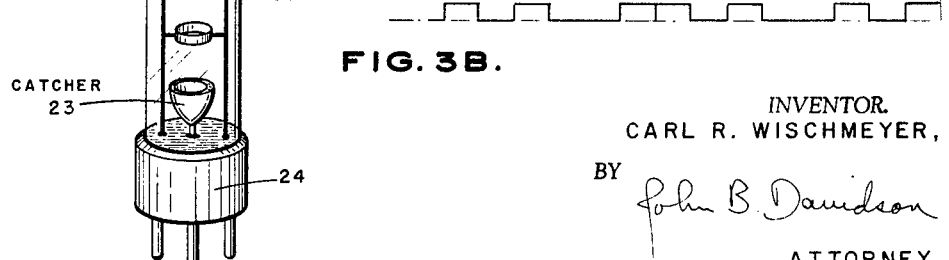

The spacing between the rings 21 relative to the width of the rings is in accordance with the terms of the binary code of maximal length produced by the code generator 1. The manner in which this spacing is determined will become evident upon inspection of the waveforms of FIG. 3A and FIG. 3B. In FIG. 3A is shown a short portion of a binary code of maximal length having the designation 1101100. A constant frequency electrical signal is varied between two phase relationships to produce this code group. If the signal is clipped at a low amplitude and amplified, the resulting signal will be as shown in FIG. 3B. If this signal is applied to the beam intensity control means 17, clusters of charged particles will pass between the charged particle source 15 and the beam catcher 23, the length of which will be determined by the periods during which the electrical signal is applied to the beam intensity control means, and the spaces between the clusters will be determined by the periods during which no signal is applied to the beam intensity control means 17. When the clusters of charged particles pass through the conductive rings 21, charges will be induced on the conductive rings. Now, if the width of the conductive rings corresponds (not necessarily equals) to the length of the clusters of charged particles and the distance between the rings equals the distance between the centers of the clusters, then, shortly after the end of the signal applied to beam intensity control means 17, a cluster will underlie each of the rings and the output signal from the rings as detected by the electrometer amplifier 27 will be a maximum.

Manifestly, if the amplitude rather than the phase of the seismic signal produced by transducer 3 were varied in accordance with the binary code of maximal length, then the width of the conductive rings 21 would depend on the time duration of each pulse transmitted into the ground, and the space between the conductive rings would be determined by the time between pulses. Thus, the conductive rings would correspond to the binary digit 1, and the space between the conductive ring would be determined by the binary digits 0 in the shift register binary code of maximal length injected into the ground by transducer 3.

Any absolute length scale of the width of the rings and the unit spacing may be accommodated by an appropriate beam velocity, which depends upon the mass of particles used and the accelerating voltage. By connecting the output of the code generator 1 directly to amplifier and clipper circuit 9 and adjusting the the voltage from the power supply 25 until the events indicated by oscilloscope 29 are a maximum, then, an individual tube structure is calibrated for operation at that voltage.

The operation of the over-all apparatus illustrated in FIG. 1 is as follows: Let it be assumed that timer 35 is actuated periodically to produce output pulses for activating code generator 1 so that it produces a single shift register binary code of maximal length, and for activating the horizontal sweep circuit 33 of the oscilloscope 29 so that a timing sweep is initiated thereon. The transducer 3 will transmit signals into the earth (or transmission medium 5) which will be detected by the pick-ups 7. The signal detected by the pick-ups 7 will be a very complex signal comprising reflections from subterranean earth interfaces of the signal injected into the earth by transducer 3, as well as extraneous signals from localized reflectors, from ground unrest, and from other extraneous seismic sources. This signal is applied to amplifier and clipper 9 to produce a square wave signal which is amplified by beam intensity control voltage amplifier 11 and applied to the beam intensity control means 17. The charged particle beam passing from the source 15 to the catcher 23 is modulated by this complex signal, and clusters of charged particles will pass through the conductive rings 21 as determined by the signal. When the spatial distribution of the clusters of charged particles is such as to correspond to the conductive rings 21, then a maximum signal will be produced from the rings and the electrometer amplifier 27. The time from the initiation of the code sequence by timer 35 to the instant that the maximum signal is indicated by the oscilloscope 29 will be the two-way deflection time of signals transmitted from transducer 3 to a subsurface reflecting horizon and back to pick-up 7. Manifestly, there will be more than one reflecting horizon in the earth so that a number of maximum signal indications will be produced by the oscilloscope 29 responsive to each timing pulse of timer 35.

Manifestly, the oscilloscope 29 may be replaced by a seismic recorder of conventional design wherein permanent traces of electrical signals are produced as a function of time. Likewise, other changes may be made in the design noted above. The invention therefore is not necessarily to be be restricted to the specific structural details, arrangement of parts, or circuit connections herein set forth, as various modifications thereof may be effected without departing from the spirit and scope of the invention.

What is claimed is:

1. Apparatus for use in seismic exploration comprising: code generator means for generating an electrical binary code pulse sequence of maximal length responsive to an actuating electrical pulse;
electroacoustic transducer means connected to said code generator means for producing acoustic waves responsive to the electrical pulse sequence from said code generator means;
acoustoelectric detector means for detecting acoustic waves including those produced by said transducer means, and for producing corresponding electrical output signals;
an elongated high-vacuum housing;
a source of electrically charged particles in said housing;
a catcher for said particles in said housing;
means connected between said particle source and said catcher for producing an electrical field therebetween to attract particles toward said catcher;
focusing and beam intensity control means for focusing the particles in transit from said source to said catcher, and for gating the flow of particles in accordance with electrical signals coupled thereto;
electrical circuit means electrically connected between said detector means and said beam intensity control means for converting the electrical output signals into electrical pulses for controlling the beam intensity control means to gate the flow of electrical particles thereby;
a plurality of discrete annular conductive members positioned between said focusing and beam intensity control means encircling the flight path of said charged electrical particles;
an oscilloscope having horizontal deflection control means and vertical deflection control means;
means electrically connecting said conductive members to one of said deflection control means for controlling said one deffection control means; and
a timing means electrically connected to the other of said deflection control means and to said code generator means for providing actuating pulses to said code generator means and for controlling said other deflection control means.

2. Apparatus for use in seismic exploration comprising:
code generator means for generating an electrical binary code pulse sequence of maximal length responsive to an actuating electrical pulse;
electroacoustic transducer means connected to said code generator means for producing acoustic waves responsive to the electrical pulse sequence from said code generator means;
acoustoelectric detector means for detecting acoustic waves including those produced by said transducer means, and for producing corresponding electrical output signals;
an elongated high-vacuum housing;
a source of electrically charged particles in said housing;
a catcher for said particles in said housing;
means connected between said particle source and said catcher for producing an electrical field therebetween to attract particles toward said catcher;
focusing and beam intensity control means for focusing the particles in transit from said source to said catcher, and for gating the flow of particles in accordance with electrical signals coupled thereto;
electrical circuit means electrically connected between said detector means and said beam intensity control means for converting the electrical output signals into electrical pulses for controlling the beam intensity control means to gate the flow of electrical particles thereby;
a plurality of discrete annular conductive members positioned between said focusing and beam intensity control means encircling the flight path of said charged electrical particles; and
means connected in circuit relationship with said code generator means and said annular conductive members for providing activating pulses to said code generator means, for summing electrical signals induced in said annular members, and for measuring elapsed time from each activating pulse to the events in the summed electrical signal.

3. Apparatus for use in seismic exploration comprising:
code generator means for generating an electrical binary code pulse sequence of maximal length responsive to an actuating electrical pulse;
electroacoustic transducer means connected to said code generator means for producing acoustic waves responsive to the electrical pulse sequence from said code generator means;
acoustoelectric detector means for detecting acoustic waves including those produced by said transducer means, and for producing corresponding electrical output signals;
an elongated high-vacuum housing;
a source of electrically charged particles in said housing;
a catcher for said particles in said housing;
means connected between said particle source and said catcher for producing an electrical field therebetween to attract particles toward said catcher;
focusing and beam intensity control means for focusing the particles in transit from said particle source to said catcher, and for gating the flow of particles in accordance with electrical signals coupled thereto;
electrical circuit means electrically connected between said detector means and said beam intensity control means for converting the electrical output signals into electrical pulses for controlling the beam intensity control means to gate the flow of electrical particles thereby;
a plurality of discrete annular conductive members positioned between said focusing and beam intensity control means encircling the flight path of said charged electrical particles; and
means connected in circuit relationship with said code generator means and said annular conductive members for providing activating pulses to said code generator means, for summing electrical signals induced in said annular members, and for measuring elapsed time from each activating pulse to the events in the summed electrical signal;
said last-named means including an electrometer amplifier electrically connected to each of said annular conductive members for summing variations in current induced in said annular conductive members.

4. Apparatus for producing an electrical signal indicative of the time position of a shift register binary code signal of maximal length in an input data signal comprising the shift register binary code signal of maximal length in an extraneous signal having a longer time duration than said shift register binary code signal of maximal length, said input data signal being of finite time duration, comprising:
an elongated high-vacuum housing;
a source of charged electrical particles in said housing;
a catcher for said particles in said housing;
focusing means in said housing for focusing said particles in transit from said particle source to said catcher;
beam intensity control means for gating the flow of charged particles responsive to electrical signals coupled thereto;
a plurality of annular conductive rings positioned between said beam intensity control means and said catcher encircling the flight path of said charged particles;
the spacing between said rings relative to the width of said rings being in accordance with the terms of said binary code of maximal length;
means connected to said beam intensity control means for receiving said input data signal and rectifying and converting said data signal to square waveform to control said beam intensity control means; and
means connected to said rings for summing electrical signals induced in said rings for measuring elapsed time from the beginning of said data signal to maximum signal events in the summed signal.

5. Apparatus for producing an electrical signal indicative of the time position of a shift register binary code signal of maximal length in an input data signal comprising the shift register binary code signal of maximal length in an extraneous signal having a longer time duration than said shift register binary code signal of maximal length, said input data signal being of finite time duration, comprising:
charged electrical particle gun means for directing a beam of charged electrical particles between two locations therein, and including beam intensity control means for controlling the intensity of the beam in accordance with control electrical signals coupled thereto;
a plurality of annular conductive rings positioned along the beam path and individually encircling the beam path;
the relative positions of and the spacings between said conductive rings being according to a binary code of maximal length;
means connected to said beam intensity control means for receiving said input data signal and rectifying and converting said data signal to square waveform to control said beam intensity control means; and
means connected to said rings for summing electrical signals induced in said rings for measuring elapsed time from the beginning of said data signal to maximum signal events in the summed signal.

No references cited.

BENJAMIN A. BORCHELT, *Primary Examiner.*

R. M. SKOLNIK *Assistant Examiner.*